United States Patent [19]

Ohashi et al.

[11] Patent Number: 5,354,933
[45] Date of Patent: Oct. 11, 1994

[54] PROCESS FOR PRODUCING AROMATIC HYDROCARBONS

[75] Inventors: Hiroshi Ohashi; Hisashi Katsuno; Michio Sugimoto, all of Sodegaura, Japan

[73] Assignee: Idemitsu Kosan Co., Ltd., Tokyo, Japan

[21] Appl. No.: 183,124

[22] Filed: Jan. 18, 1994

Related U.S. Application Data

[60] Division of Ser. No. 966,262, Oct. 26, 1992, Pat. No. 5,294,579, which is a continuation-in-part of Ser. No. 810,698, Dec. 19, 1991, abandoned.

[30] Foreign Application Priority Data

| Feb. 5, 1991 | [JP] | Japan | 3-035254 |
| Nov. 12, 1991 | [JP] | Japan | 3-295922 |
| Jul. 24, 1992 | [JP] | Japan | 4-198194 |

[51] Int. Cl.⁵ ............................................ C07C 2/00
[52] U.S. Cl. .............................. 585/419; 585/407; 585/418
[58] Field of Search .................... 585/407, 418, 419

[56] References Cited

U.S. PATENT DOCUMENTS

| 3,691,255 | 9/1972 | Takase et al. | 502/66 |
| 4,104,320 | 8/1978 | Bernard et al. | 208/138 |
| 4,448,891 | 5/1984 | Cohen | 502/74 |
| 4,568,656 | 2/1986 | Poeppelmeier et al. | 502/74 |
| 4,595,669 | 6/1986 | Fung et al. | 502/74 |
| 4,627,912 | 12/1986 | Field | 423/328 |
| 4,677,236 | 6/1987 | Wortel | 585/419 |
| 4,701,315 | 10/1987 | Wortel | 585/419 |
| 4,795,549 | 1/1989 | Coughlin et al. | 208/139 |
| 5,091,351 | 2/1992 | Murakawa et al. | 502/66 |

FOREIGN PATENT DOCUMENTS

| 0201856 | 11/1986 | European Pat. Off. . |
| 0498182A | 8/1992 | European Pat. Off. . |
| 2904051 | 8/1980 | Fed. Rep. of Germany . |
| 2548204 | 1/1985 | France . |
| 58-133835 | 8/1983 | Japan . |
| 58-57408 | 12/1983 | Japan . |
| 58-223614 | 12/1983 | Japan . |
| 59-80333 | 5/1984 | Japan . |
| 60-168539 | 9/1985 | Japan . |
| 61-138539 | 6/1986 | Japan . |
| 62-57653 | 3/1987 | Japan . |
| 63-91334 | 4/1988 | Japan . |

OTHER PUBLICATIONS

Foger et al, "Redispersion of Pt-Zeolite Catalysts with Chlorine", (1989), pp. 137-147, *Applied Catalysts*, 56.

*Primary Examiner*—Asok Pal
*Assistant Examiner*—P. Achutamurthy
*Attorney, Agent, or Firm*—Frishauf, Holtz, Goodman & Woodward

[57] ABSTRACT

A process for producing aromatic hydrocarbons comprising contacting at least one hydrocarbon of the paraffin series, olefin series, acetylene series, cyclic paraffin series or cyclic olefin series with a catalyst containing an L-type zeolite containing both platinum components and halogen components supported thereon, the catalyst having a peak intensity of 0.4 or less as determined by X-ray absorption near edge structure (XANES), and the amount of dealuminization in the zeolite is 3% by weight or less, based on the total amount of aluminum therein.

16 Claims, 2 Drawing Sheets

PROCESS FOR PRODUCING AROMATIC HYDROCARBONS

This is a division of application Ser. No. 07/966,262, filed Oct. 26, 1992, now U.S. Pat. No. 5,294,579, which is a continuation-in-part of application Ser. No. 07/810,698, filed Dec. 19, 1991, abandoned.

BACKGROUND OF THE INVENTION

Field of the Invention

The present invention relates to a L-type zeolite, a catalyst for the production of aromatic hydrocarbons and a process for producing aromatic hydrocarbons by the use thereof and more particularly, to a L-type zeolite with a platinum component and a halogen component supported thereon, a catalyst comprising the L-type zeolite suitable for the aromatization reaction and a process for efficiently producing aromatic hydrocarbons from non-aromatic hydrocarbon such as paraffin series hydrocarbon by using said catalyst.

Description of the Related Art

Conventionally platinum-alumina series catalysts have been put to use as the catalyst for producing aromatic hydrocarbons by aromatizing non-aromatic hydrocarbon such as aliphatic hydrocarbon and in recent years there have been proposed the methods of using catalysts which contain L-type zeolite and platinum supported thereon, having an improved conversion efficiency (Japanese patent publication No. 57408/1983 and Japanese patent application LAID-OPEN Nos. 223614/1983 and 80333/1982).

However, all of platinum-supporting L-type zeolite catalysts used in these methods have not been found satisfactory because they have a low selectivity of aromatic hydrocarbons and a short catalyst lifetime. Meanwhile, a platinum-supporting L-type zeolite catalyst to which an alkaline earth metal (Ba, Sr, Ca) is introduced has been proposed as the improvement of said defects (Japanese patent application LAID-OPEN No. 133835/1983), but the follow-up study of the present inventors has resulted in a finding that this catalyst also is of no practical use as its selectivity of aromatic hydrocarbons and a catalyst lifetime are not sufficiently improved, along with a low catalysis stability.

There have been further proposed (1) a catalyst improved in catalytic activity and a catalyst lifetime by subjecting L-type zeolite with a metal or metals of Group VIII of the Periodic Table supported thereon to the oxychlorination treatment (Japanese patent application LAID-OPEN No. 168539/1985), (2) a catalyst whereon platinum is uniformly dispersed and supported, treated with a solution consisting of platinum solution and non-platinum metal salt (Japanese patent application LAID-OPEN No. 138539/1986), (3) a catalyst wherein platinum is supported on L-type zeolite treated with a halogen-containing compound (Japanese patent application LAID-OPEN No. 57653/1987 ), (4) a catalyst containing L-type zeolite with platinum supported thereon which is treated with a halogen-containing compound (Japanese patent application LAID-OPEN No. 91332/1988) and the like.

However, the catalysts mentioned in (1) are extremely poor in economical efficiency because of expensive equipment required for their production processes to carry out the oxychlorination treatment at high temperatures, while the catalysts of (2) do not show sufficient catalytic activity. Relative to catalyst of (3) and (4), though their catalytic activity is improved, they are still short of a sufficiently long term of a catalyst lifetime and require equipment of special type to deal with halogen components. Furthermore, it is desirable not to use these catalysts in points of the environmental protection as the halogen-containing compound to be used in their production processes is Flon gases (fluoroalkanes, chlorofluoroalkanes) which are controversial for their adverse influences on environment.

As mentioned above, the problems of the conventional catalysts lie in their production processes, catalytic activity, catalyst lifetime and the like, but a satisfactorily useful catalyst has not as yet been proposed.

Thus the present inventors have made intensive studies with a view to improving the defects of the conventional catalysts and developing a catalyst for the production of aromatic hydrocarbon which can be obtained by simple production processes without the need of special equipment, exhibiting an improved activity and having a longer term of catalyst lifetime. As the result, it has been found that above-mentioned object can be achieved by a catalyst comprising L-type zeolite and both a platinum component and a halogen component supported thereon. The present invention has been accomplished on the basis of this finding.

SUMMARY OF THE INVENTION

An object of the present invention is to provide a new zeolite suitable for a catalyst for the production of aromatic hydrocarbons.

Another object of the present invention is to provide a process for producing aromatic hydrocarbons. The present invention provides a L-type zeolite with both a platinum-containing compound and a halogen-containing compound each supported thereon characterized in that said zeolite simultaneously satisfies the conditions in which said platinum-containing compound supported on said zeolite has a peak intensity of 0.4 or less as determined by X-ray absorption near edge structure (XANES) analysis and the amount of dealuminization in said zeolite is 3% by weight or less based on the total amount of aluminum therein.

The present invention also provides a catalyst for the production of aromatic hydrocarbons, which comprises said L-type zeolite.

Further, the present invention also provides a process for producing aromatic hydrocarbons by bringing in contact with said catalyst at least one hydrocarbon selected from the group consisting of paraffin series hydrocarbons, olefin series hydrocarbons, acetylene series hydrocarbons, cyclic paraffin series hydrocarbons and cyclic olefin series hydrocarbons.

In preparing the new L-type zeolite of the present invention, conventional L-type zeolite is used as the starting material. As used herein, the L-type zeolite is represented by a compositional formula of $0.9\sim1.3$ $M_{2/n}O \cdot Al_2O_3 \cdot 5.0\sim7.0\ SiO_2 \cdot 0\sim9H_2O$ wherein M represents an alkali metal or an alkaline earth metal and n represents the valency of M, and more specifically is L-type zeolite disclosed in Japanese patent application LAID-OPEN Nos. 133835/1983, pp. 9~10 and 80333/1984, p. 5.

DESCRIPTION OF PREFERRED EMBODIMENTS

The platinum-containing compound to be used in the present invention is not limited in any way and may be any of platinum sources. It may be ordinarily platinum salts and more specifically platinum tetrammine chloride, chloroplatinic acid, chloroplatinate, platinum tetrammine hydroxide, dinitrodiamino platinum and the like.

Further, the halogen-containing compound may be any of various different compounds. More specifically, it may be chlorine-containing compounds such as hydrogen chloride and ammonium chloride, fluorine-containing compounds such as hydrogen fluoride and ammonium fluoride, iodine-containing compound such as hydrogen iodide and ammonium iodide and bromine-containing compounds such as hydrogen bromide and ammonium bromide. Either one of the abovementioned compounds singly or a mixture of two or more of them can be used as the halogen-containing compound.

In preparing the L-type zeolite of the present invention, procesures for supporting said platinum-containing compound and halogen-containing compound on the starting L-type zeolite are not subject to any limitation, but any conventional one capable of supporting the platinum component and the halogen component can be used, including the ordinary pressure impregnation method, the vacuum impregnation method, the dipping method and the ion exchange method. In the case where the platinum-containing compound and the halogen-containing compound are each supported on the L-type zeolite, it is permissible that the former be supported thereon simultaneously with, prior to or later than the latter. The amount of supported compounds is not subject to any limitation at the time of supporting treatment, but that of supported platinum-containing compound is preferably 0.1 to 5.0% by weight (calculated as platinum) on the basis of the total weight of the catalyst and particularly the range of 0.3 to 1.5% by weight is best suited, Further, the amount of supported halogen-containing compound is preferably 0.1 to 5% by weight (calculated as halogen) on the basis of the total weight of the catalyst.

The amount of dealuminization in the L-type zeolite in the present invention is preferably minimized and is usually 0 to 3.0% or less, desirably 0 to 2.0% or less more desirably 0 to 1.0% or less each by weight based on the weight of the aluminum in the zeolite as the starting material.

The amount of dealuminization in the L-type zeolite was determined by obtaining the proportion of the co-ordinated aluminum atoms around the Si atoms by means of $^{29}$Si-NMR analysis, and thereby calculating the aluminum amount in the skeleton.

The L-type zeolite of the present invention has a peak intensity of 0.4 or less as determined by XANES analysis.

Figure 2:
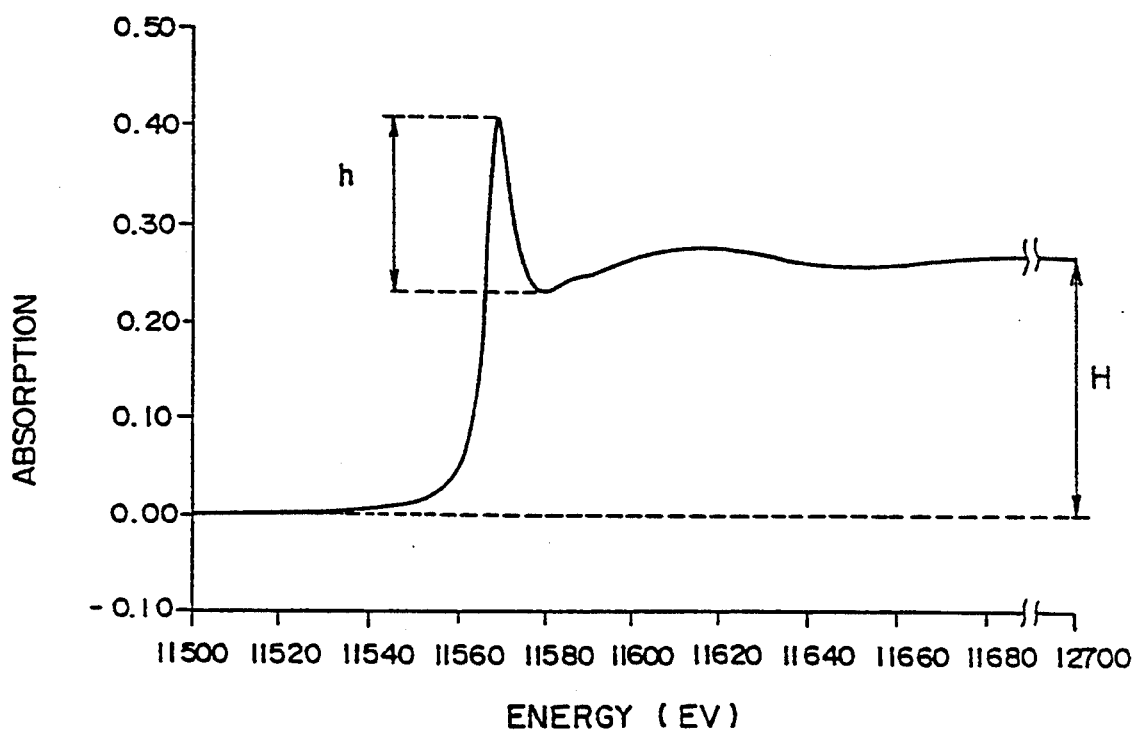
FIG. 2 is a XANES spectrum of the platinum-containing compound in L-type zeolite

XANES, that is, the abbreviation of X-ray absorption near edge structure reflects the electron condition of the element to be determined. Here, the measurement is made for the L3 absorption near edge structure of the platinum-containing compound in the L-type zeolite of the present invention. Since the X-ray absorption spectrum thus obtained includes the background absorption and the like due to the coexistent atoms, a XANES spectra as FIG. 2 is obtained by subtracting such background absorption (usually, the absorption of the portion with lower energy than that near edge structure, which absorption is approximated by Victoreen's formula)

The XANES spectrum is considered to relate to the number of holes in d-band and represent the electron density in the platinum.

The following parameters were determined from the XANES spectrum thus obtained:

h: (initial peak top intensity)−(initial wave-trough intensity)

H: intensity at 12.7 keV

The parameter obtained by dividing h by H, h/H, means a peak intensity as determined by XANES analysis. In the L-type zeolite of the present invention, h/H is equal to or less than 0.4, desirably 0.3, more desirably 0.25.

Supporting treatment conditions are not subject to any limitation and can be determined appropriately depending upon various different circumstances. Usually the supporting treatment is carried out by bringing L-type zeolite in contact with the platinum-containing compound and the halogen-containing compound at room temperature to 90° C. for 1 minute to 10 hours.

The L-type zeolite thus prepared can be used for the catalyst of the present invention as such or in combination with other additional components.

Natural or synthetic inorganic oxides, for example alumina, silica, aluminosilicate and the like may be added to the catalyst of the present invention as the binder if need be. These binders are added preferably in an amount of 5 to 90% by weight on the basis of the total weight of the catalyst.

As above-mentioned, while the catalyst of the present invention can be produced without requiring special equipment or processes, the so obtained catalyst is used as a so-called aromatization catalyst for producing a high yield of aromatic hydrocarbons from varieties of hydrocarbon under various different reaction conditions and aromatic hydrocarbons can be efficiently produced in accordance with the process of the present invention.

Under the process for producing aromatic hydrocarbons of the present invention, aromatic hydrocarbons are produced by bringing the hydrocarbon raw material selected from the group consisting of paraffin series hydrocarbons, olefin series hydrocarbons, acetylene series hydrocarbons, cyclic paraffin series hydrocarbons and cyclic olefin series hydrocarbons in contact with said catalyst of the present invention.

As said paraffin series hydrocarbons, those having 6 to 10 carbon atoms are preferred and more specifically including n-hexane, methylpentane, n-heptane, methylhexane, dimethylpentane, n-octane and the like.

Olefin series hydrocarbons include those having 6 to 10 carbon atoms and more specifically hexene, methylpentene, heptene, methylhexene, dimethylpentene, octene and the like. Acetylene series hydrocarbons include those having 6 to 10 carbon atoms and more specifically hexyne, heptyne, octyne and the like.

Cyclic paraffin series hydrocarbons include those having 6 to 10 carbon atoms and more specifically methylcyclopentane, cyclohexane, methylcyclohexane, dimethylcyclohexane and the like.

Further, cyclic olefin series hydrocarbons include those having 6 to 10 carbon atoms and more specifically methylcyclopentene, cyclohexene, methylcyclohexene, dimethylcyclohexene and the like.

The process of the present invention is allowed to proceed as said hydrocarbon raw material comes in contact with said catalyst, and the conditions thereof are not subject to any limitation. However, it is successfully carried out under the conditions of temperature of 350° to 600° C., preferably 400° to 500° C., pressure of 0 to 40 kg/cm²G, preferably 0 to 10 kg/cm²G and liquid hourly space velocity (LHSV) of 0.1 to 20 hr⁻¹, preferably 1 to 10 hr⁻¹. Further, the feed ratio of hydrogen gas/hydrocarbon raw material in the range of 0 to 50 mol/mol enables the process of the present invention to be more successful.

As described above, the catalyst of the present invention is a very useful catalyst for the production of aromatic hydrocarbons because it can be prepared by using the commonplace simple processes without the need of special equipment and is capable of producing aromatic hydrocarbons from varieties of hydrocarbons during a long-term stable operation with a high yield and high activity.

Further, the process for producing aromatic hydrocarbons of the present invention enables the production of high yields of aromatic hydrocarbons, while the catalyst thereof can remain activated for a long period of time, and therefore a long-term aromatization operation can be continued with the yield of aromatic hydrocarbons remaining at a high level according to the present invention.

Also, relative to the catalyst of the present invention, the span of its catalyst lifetime is significantly improved, there is less incidence of its reactivation and finished products are manufactured at a low cost and a high productivity. Thus the catalyst of the present invention is very useful industrially, finding a wide range of application in the fields of petrochemistry for the production of aromatic hydrocarbons and petroleum refining industry in obtaining of high octane number fuel.

The present invention will be described in greater detail with reference to the following examples.

EXAMPLE 1

(1) Preparation of Catalyst

To 100 parts by weight of L-type zeolite (a "TSZ-500KOA" brand supplied by Toso Co., Ltd.), 20 parts by weight of a silica binder (a "Snowtex" brand supplied by Nissan Kagaku Co., Ltd.) were added and the mixture was mixed, kneaded and molded. Then the so obtained molded mixture was air-calcined at 500° C. for 2 hours and a silica binder-molded L-type zeolite was obtained.

Next, 1.39 g of a 3.6% by weight solution of hydrogen chloride, 0.097 g of ammonium fluoride, 0.171 g of platinum tetraamine chloride and 3.6 g of ion exchange water were mixed to obtain an impregnation liquid.

The so obtained impregnation liquid is slowly dropped in 10 g of said silica binder-molded L-type zeolite with stirring, subjecting platinum and halogen to the supporting treatment simultaneously. After it was dried at room temperature overnight, zeolite so processed was treated at 300° C. for 30 minutes in the air and a catalyst was obtained.

(2) Production of Aromatic Hydrocarbons 0.5 g of the catalyst prepared in Example (1) was placed in a quartz reactor and treated at 540° C. for 24 hours in a stream of hydrogen.

Figure 1:
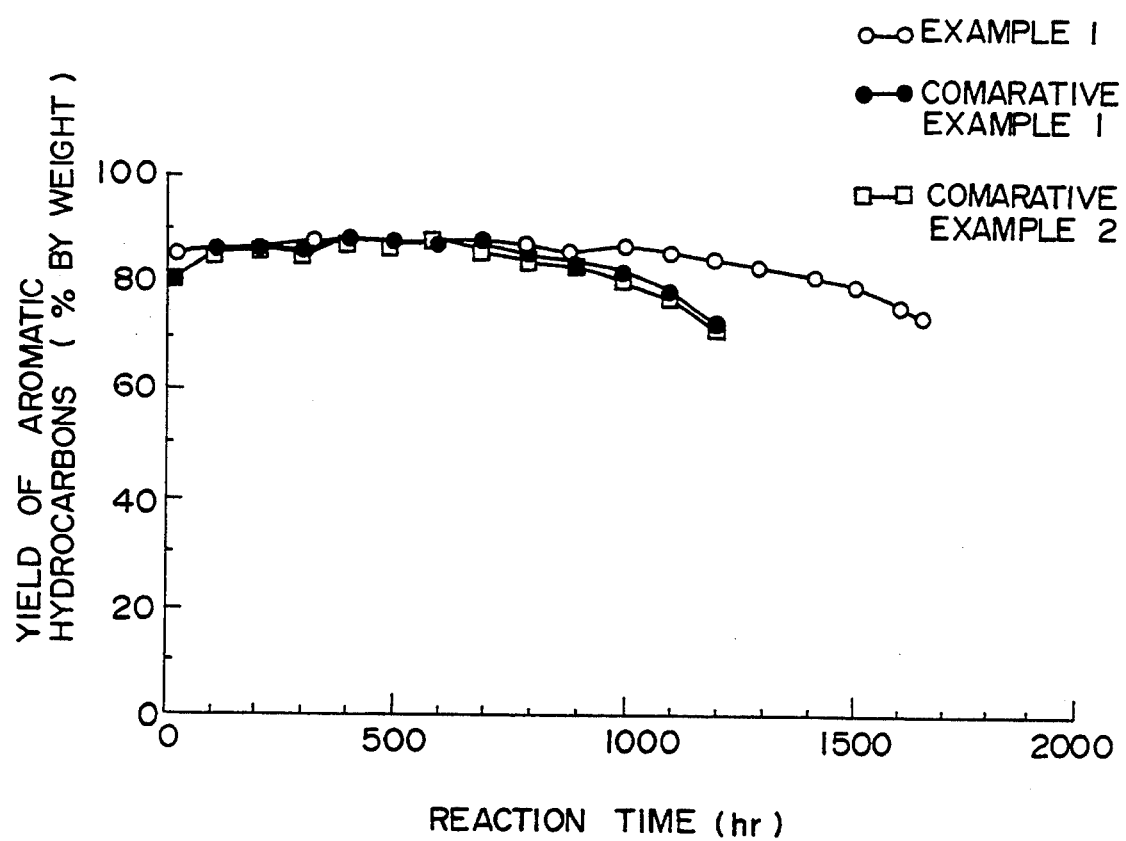
FIG. 1 is a graph showing changes in a yield of obtained aromatic hydrocarbons with the elapse of time, while the reaction was carried out in Example 1, Comparative Example 1 and Comparative Example 2.

Thereafter, using light naphtha having the composition of n-hexane/isohexane/methylcyclopentane=49/43/8 by weight and hydrogen respectively as a feed, the aromatization reaction was carried out under the conditions of weight hourly space velocity of 2 hr⁻¹, hydrogen/light naphtha ratio of 5 mol/1 mol, pressure of 5 kg/cm²G and temperature of 500° C. FIG. 1 shows the changes that occurred in the yield of aromatic hydrocarbons thus obtained with the elapse of time while the reaction was carried out.

COMPARATIVE EXAMPLE 1

(1) Preparation of Catalyst 20 g of silica binder-molded L-type zeolite obtained in Example 1 (1) was placed in a quartz reactor and maintained at 200° C. for 30 minutes while passing nitrogen gas therethrough, then the gas was replaced by monochlorotrifluoromethane gas and the temperature was elevated to 500° C. After the temperature was elevated to 500° C., said zeolite-was treated for 2 hours, the gas was replaced by nitrogen gas again, the temperature was lowered and a halogen-treated L-type zeolite was obtained.

An impregnation liquid comprising 0.171 g of platinum tetrammine chloride and 4.0 g of ion exchange water was slowly dropped in 10 g of said halogen-treated L-type zeolite with stirring to carry out the supporting treatment. After the supporting treatment, said zeolite was dried in a desiccator at 80° C. for 3 hours and a catalyst was obtained.

(2) Production of Aromatic Hydrocarbons

The aromatization reaction was carried out in the same matter as in Example 1 (2) except that the catalyst of Example 1 (2) was replaced by the catalyst obtained in Comparative Example 1 (1). FIG. 1 shows the changes in the yield of aromatic hydrocarbons thus obtained with the passage of time.

COMPARATIVE EXAMPLE 2

(1) Preparation of Catalyst

An impregnation liquid comprising 0.171 g of platinum tetrammine chloride and 4.8 g of ion exchange water was slowly dropped in 10 g of silica binder-molded L-type zeolite obtained in Example 1 (1) with stirring, said zeolite was dried at room temprature for 2 hours, then treated at 80° C. for 3 hours in the air and a catalyst was obtained.

The catalyst thus obtained was placed in a quartz reactor and maintained at 200° C. for 1 hour in a stream of nitrogen gas, followed by elevating the temperature to 480° C. At 480° C., the gas was replaced by a gas mixture of Flon 112 (1,1,2,2-tetrachloro-1,2-difluoroethane)/nitrogen=0.1/99.9% by volume, and the catalyst was treated for 10 hours. Thereafter, the gas was replaced by nitrogen gas again, the temperature was lowered and a catalyst was prepared.

(2) Production of Aromatic Hydrocarbons

The aromatization reaction was carried out in the same manner as in Example 1 (2) except that the catalyst used in Example 1 (2) was replaced by the catalyst obtained in Comparative Example 2 (1). FIG. 1 shows the changes of the yield of aromatic hydrocarbons thus obtained with the elapse of time.

EXAMPLE 2

(1) Preparation of Catalyst

A catalyst was obtained in the same manner as in Example 1 (1).

(2) Production of Aromatic Hydrocarbons 0.05 g of the catalyst obtained in Example 2 (1) was collected and placed in a pulse reactor. Then, it was heated to 500° C. for 1 hour and maintained at 500° C. for another 1 hour in a stream of hydrogen gas. The reaction temperature was adjusted to 470° C. and the aromatization reaction was carried out by subjecting n-hexane to a 3 microliter pulse in a stream of hydrogen gas (2.2 liters/hr). As the result, benzene was obtained in a 55.7% yield.

COMPARATIVE EXAMPLE 3

(1) Preparation of Catalyst

The impregnation liquid comprising 0.171 g of platinum tetrammine chloride and 4.8 g of ion exchange water was slowly dropped in 10 g of silica binder-molded L-type zeolite obtained in Example 1 (1) with stirring, said zeolite was dried at room temperature overnight, and then treated at 300° C. for 30 minutes to prepare a catalyst.

(2) Production of Aromatic Hydrocarbons

The aromatization reaction was carried out in the same manner as in Example 2 (2) except that the catalyst of Example 2 (2) was replaced by the catalyst obtained in Comparative Example 3 (1). As the result, benzene was obtained in a 32.1% yield.

EXAMPLE 3

(1) Preparation of Catalyst

To 100 parts by weight of L-type zeolite (a "TSZ-500KOA" brand supplied by Toso Co., Ltd. ), 20 parts by weight of a silica binder (a "Snowtex" brand supplied by Nissan Kagaku Co., Ltd.) were added with mixing kneaded and molded. Then the molded mixture thus obtained was air-calcined at 500° C. for 2 hours and a silica binder-molded L-type zeolite was obtained.

Next, 0.097 g of ammonium fluoride, 0.171 g of platinum tetrammine chloride and 4.8 g of ion exchange water were mixed to obtain an impregnation liquid. The impregnation liquid thus obtained was slowly dropped in 10 g of said silica binder-molded L-type zeolite with stirring, subjecting platinum and halogen to the supporting treatment simultaneously. After it was dried at room temperature overnight, zeolite so processed was treated at 300° C. for 3 hours in the air and a catalyst was obtained.

(2) Production of Aromatic Hydrocarbons 0.5 g of the catalyst prepared in Example 3 (1) was placed in a quartz reactor and treated at 540° C. for 24 hours in a stream of hydrogen.

Thereafter, using light naphtha having the composition of n-hexane/isohexane/methylcyclopentane=49/43/8 by weight and hydrogen respectively as a feed, the aromatization reaction was carried out under the conditions of weight hourly space velocity of 16 hr$^{-1}$, hydrogen/light naphtha ratio of 5 mol/1 mol, pressure of 5 kg/cm$^2$G and temperature of 517° C. and maintenance for 20 hours. As the result, aromatic hydrocarbons were obtained in a 52.9% yield.

EXAMPLE 4

(1) Preparation of Catalyst

The impregnation liquid comprising 0.097 g of ammonium fluoride, 0.075 g of ammonium chloride, 0.171 g of platinum tetrammine chloride and 4.8 g of ion exchange water was slowly dropped in 10 g of silica binder-molded L-type zeolite, obtained in Example 3 (1), with stirring, said zeolite was dried at room temperature overnight, then treated at 300° C. for 3 hours in the air to prepare a catalyst.

(2) Production of Aromatic Hydrocarbons

The aromatization reaction was carried out in the same manner as in Example 3 (2) except that the catalyst of Example 3 (2) was replaced by the catalyst obtained in Example 4 (1). As the result, aromatic hydrocarbons were obtained in a 63.8% yield.

EXAMPLE 5

(1) Preparation of Catalyst

The impregnation liquid comprising 0.097 g of ammonium fluoride, 0.061 g of ammonium bromide, 0.171 g of platinum tetrammine chloride and 4.8 g of ion exchange water was slowly dropped in 10 g of silica binder-molded L-type zeolite obtained in Example 3 (1) with stirring, said zeolite was dried at room temperature overnight, then treated at 300° C. for 3 hours in the air to prepare a catalyst.

(2) Production of Aromatic Hydrocarbons

The aromatization reaction was carried out in the same manner as in Example 3 (2) except that the catalyst of Example 3 (2) was replaced by the catalyst obtained in above Example 5 (1). As the result, aromatic hydrocarbons were obtained in a 60.9% yield.

COMPARATIVE EXAMPLE 4

(1) Preparation of Catalyst

The impregnation liquid comprising 0.171 g of platinum tetrammine chloride and 4.8 g of ion exchange water was slowly dropped in 10 g of silica binder-molded L-type zeolite, obtained in Example 3 (1), with stirring, said zeolite was dried at room temperature for 2 hours, then treated at 120° C. for 3 hours in the air to obtain a catalyst with platinum supported thereon.

(2) Production of Aromatic Hydrocarbons

The aromatization reaction was carried out in the same manner as in Example 3 (2) except that the catalyst of Example 3 (2) was replaced by the catalyst obtained in Comparative Example 4 (1). As the result, aromatic hydrocarbons were obtained in a 35.2% yield.

EXAMPLE 6

(1) Preparation of Catalyst

To 100 parts by weight of L-type zeolite (a "TSZ-500KOA" brand supplied by Toso Co., Ltd. ), 20 parts by weight of a silica binder (a "Snowtex" brand supplied by Nissan Kagaku Co., Ltd. ) were added and the mixture was mixed, kneaded and molded. Then the so obtained molded mixture was air-calcined at 500° C. for 2 hours and a silica binder-molded L-type zeolite was obtained.

Next, 0.167 g of ammonium fluoride, 0.171 g of platinum tetraammine chloride, 0.075 g of ammonium chloride and 4.5 g of ion exchange water were mixed to obtain an impregnation liquid.

The so obtained impregnation liquid is slowly dropped in 10 g of said silica binder-molded L-type zeolite with stirring, subjecting platinum and halogen to the supporting treatment simultaneously. After it was dried at room temperature overnight, zeolite so processed was treated at 300° C. for 3 hours in the air and a catalyst was obtained.

(2) Evaluation on the Physical Properties of the Catalyst

The amount of dealuminization was obtained by carrying out $^{29}Si$-NMR analysis for the preceding (1) catalyst, subjecting the analysis result to wave-form separation to calculate the aluminum amount in the skeleton and comparing the calculated amount with the aluminum amount in the L-type zeolite as the starting material.

XANES analysis

The catalyst in the above (1) was reduced with hydrogen at 540° C. for 24 hours at a hydrogen flow rate of 6.5 liters/hr, and the reduced sample was ground followed by molding, placed in an in-situ measuring apparatus and reduced again with hydrogen at 540° C. for 1 hour at a hydrogen flow rate of 10 cc/min. Thereafter the apparatus was evacuated at 540° C., that is, the same as the above temperature, cooled to room temperature and sealed together with the reduced sample by introducing nitrogen gas thereinto. The sample thus prepared was analyzed for XANES. The result obtained was calculated according to the above-mentioned definition. The resultant calculated values is given in Table 1.

(3) Production of Aromatic Hydrocarbons 0.25 g of the catalyst prepared in Example 6 (1) was placed in a quartz reactor and treated at 540° C. for 24 hours at a hydrogen flow rate of 6.5 liters/hr.

Thereafter, using light naphtha having the composition of n-hexane/isohexane/methylcyclopentane=49/43/8 by weight and hydrogen respectively as a feed, the aromatization reaction was carried out under the conditions of weight hourly space velocity of 32 hr$^{-1}$, hydrogen/light naphtha ratio of 5 mol/1 mol, pressure of 5 kg/cm$^2$G and temperature of 517° C. Table 1 shows the yield of aromatic hydrocarbons after 5 hours from start of the reaction.

COMPARATIVE EXAMPLE 5

(1) Preparation of Catalyst 20 g of silica binder-molded L-type zeolite obtained in Example 6 (1) was placed in a quartz reactor and maintained at 200° C. for 30 minutes while passing nitrogen gas theretrough, then the gas was replaced by monochlorotrifluoromethane gas and the temperature was elevated to 500° C. After the temperature was elevated to 500° C., said zeolite was treated for 2 hours, the gas was replaced by nitrogen gas again, the temperature was lowered and a halogen-treated L-type zeolite in which the amount of halogen is almost the same as in Example 6 was obtained.

An impregnation liquid comprising 0.171 g of platinum tetrammine chloride and 4.5 g of ion exchange water was slowly dropped in 10 g of said halogen-treated L-type zeolite with stirring to carry out the supporting treatment. After the supporting treatment, said zeolite was dried in a desiccator at 120 ° C. for 3 hours and a catalyst was obtained.

(2) Evaluation on the Physical Properties of the Catalyst

The procedure in Example 6 (2) was repeated except that there was used the catalyst obtained in Comparative Example 5 (1) in place of the catalyst in Example 6. The result is given in Table 1.

(3) Production of Aromatic Hydrocarbons

The aromatization reaction was carried out in the same matter as in Example 6 (3) except that the catalyst of Example 6 (3) was replaced by the catalyst obtained in Comparative Example 5 (1). Table 1 shows the yield of aromatic hydrocarbons thus obtained.

COMPARATIVE EXAMPLE 6

(1) Preparation of Catalyst

An impregnation liquid comprising 0.171 g of platinum tetrammine chloride and 4.5 g of ion exchange water was slowly dropped in 10 g of silica binder-molded L-type zeolite obtained in Example. 6 (1) with stirring, said zeolite was dried at 120° C. for 3 hours and a catalyst was obtained.

(2) Evaluation on the Physical Properties of the Catalyst

The procedure in Example 6 (2) was repeated except that there was used the catalyst obtained in Comparative Example 6 (7) in place of the catalyst in Example 6. The result is given in Table 1.

(3) Production of Aromatic Hydrocarbons

The aromatization reaction was carried out in the same manner as in Example 6 (3) except that the catalyst used in Example 6 (3) was replaced by the catalyst obtained in Comparative Example 6 (1). Table 1 shows the changes of the yield of aromatic hydrocarbons thus obtained.

COMPARATIVE EXAMPLE 7

(1) Preparation of Catalyst 0.107 g of potassium fluoride, 0.0735 g of potassium chloride, 0.120 g of platinum tetrammmine chloride and 3.50 g of ion exchange water were mixed to prepare an impregnation liquid.

The impregnation liquid thus prepared was slowly dropped in 7 g of silica binder-molded L-type zeolite obtained in Example 6 (1) with stirring. Then, after it was dried at room temperature overnight, said zeolite was treated at 300° C. for 30 minutes to prepare a catalyst.

(2) Evaluation on the Physical Properties of the Catalyst

The procedure in Example 6 (2) was repeated except that there was used the catalyst obtained in Comparative Example 7 (1) in place of the catalyst in Example 6. The result is given in Table 1.

(3) Production of Aromatic Hydrocarbons

The aromatization reaction was carried out in the same manner as in Example 6 (3) except that the catalyst of Example 6 (3) was replaced by the catalyst obtained in Comparative Example 7 (1). Table 1 shows the changes of the yield of aromatic hydrocarbons thus obtained.

TABLE 1

| No. | Amount Dealuminization (%) | Peak Intensity by XANES, h/H | Yield of Aromatic Hydrocarbons (wt %) |
|---|---|---|---|
| Example 6 | 0.8 | 0.22 | 56.5 |
| Comparative Example 5 | 3.8 | 0.26 | 51.5 |
| Comparative Example 9 | standard | 0.59 | 22.9 |
| Comparative Example 7 | 0.4 | 0.45 | 24.4 |

As can be seen from the results thus obtained, it has been made possible to suppress the dealuminization and further to prepare the catalyst having a high platinum electron density by treating the catalyst with an inorganic halogen compound; besides the catalyst treated in such a way exhibits a high activity in the aromatization reaction of a hydrocarbon.

What is claimed is:

1. A process for producing aromatic hydrocarbons which comprises contacting at least one starting hydrocarbon selected from the group consisting of acyclic paraffins, acyclic olefins, acetylenic hydrocarbons, cyclic paraffins and cyclic olefins, with a catalyst, under aromatization conditions, said catalyst comprising zeolite comprising both a platinum-containing compound and a halogen-containing compound each supported on said zeolite, said zeolite simultaneously satisfies the conditions that (i) said platinum-containing compound supported on said zeolite has a peak intensity of 0.4 or less as determined by X-ray absorption near edge structure (XANES) analysis and (ii) the amount of dealuminization in said zeolite is 3% by weight or less, based on the total amount of aluminum therein.

2. The process according to claim 1, wherein said starting hydrocarbon is contacted with said catalyst at a temperature of 350° to 600° C., a pressure of 0 to 40 kg/cm$^2$G, a liquid hourly space velocity of o0.1 to 10 hr$^{-1}$ and in the presence of hydrogen with a molar feed ratio of said hydrogen to said hydrocarbon of 0 to 50.

3. The process of claim 2 wherein the zeolite is of the formula 0.9 to 1.3 M$_{2/n}$O.Al$_2$O$_3$.5.0 to 7.0SiO$_2$.0 to 9H$_2$O wherein M is an alkali metal or an alkaline earth metal and n is the valency of M.

4. The process of claim 3, wherein the platinum-containing compound is selected from the group consisting of platinum tetramine chloride, chloroplatinic acid, chloroplatinate, platinum tetramine hydroxide and dinitrodiamino platinum.

5. The process of claim 4, wherein the platinum-containing compound is in an amount of 0.1 to 5.0% by weight, calculated as platinum, based on the total weight of the catalyst.

6. The process of claim 5, wherein the halogen-containing compound is selected from the group consisting of hydrogen chloride, ammonium chloride, hydrogen fluoride, ammonium fluoride, hydrogen iodide, ammonium iodide, hydrogen bromide and ammonium bromide.

7. The process of claim 6 wherein the halogen-containing compound is in an amount of 0.1 to 5% by weight, calculated as halogen, based on the total weight of the catalyst.

8. The process of claim 7, wherein the platinum-containing compound is in an amount of 0.3 to 1.5% by weight, calculated as platinum, based on the total weight of the catalyst.

9. The process of claim 8, wherein the amount of dealumination is 0 to 2.0% or less.

10. The process of claim 8, wherein the amount of dealumination is 0 to 1.0% or less.

11. The process of claim 10, wherein the peak intensity determined by XANES analysis is 0.3.

12. The process of claim 10, wherein the peak intensity determined by XANES is 0.25.

13. The process of claim 10, wherein the peak intensity determined by XANES is 0.22 and the amount of dealuminization is 0.8%.

14. The process of claim 2, wherein the catalyst is produced by the simultaneous introduction of the platinum-containing compound and the halogen-containing compound to the L-type zeolite.

15. The process of claim 2, wherein the starting hydrocarbon is selected from the group consisting of n-hexane, methylpentane, n-heptane, methylhexane, dimethylpentane, n-octane, hexene, methylpentene, heptene, methylhexene, dimethylpentene, octene, hexynyl, heptyne, octyne, methylcyclopentane, cyclohexane, methycyclohexane, dimethylcyclohexane, methylcyclopentene, cyclohexene, methylcyclohexene and dimethylcyclohexene.

16. The process of claim 15, wherein the temperature is 400° to 500° C., the pressure is 0 to 10 kg/cm$^2$G, the liquid hourly space velocity is 1 to 10 hr$^{-1}$.

* * * * *